United States Patent [19]

Henry et al.

[11] Patent Number: 4,880,344
[45] Date of Patent: Nov. 14, 1989

[54] DEVICE FOR PREVENTING LOOSENING OF A MEMBER

[76] Inventors: Max Henry, 17, rue Rabé, 8923 Pontigny; David Callendrier, Rue des Pêcheurs, 7446 Marnaz, both of France

[21] Appl. No.: 221,046

[22] Filed: Jul. 19, 1988

[30] Foreign Application Priority Data

Jul. 22, 1987 [FR] France .................................. 8710380

[51] Int. Cl.⁴ ........................ F16B 19/00; F16B 33/00; F16B 37/14
[52] U.S. Cl. .................................... 411/374; 411/429; 411/910; 10/86 C
[58] Field of Search .............................. 411/371–374, 411/429, 431, 396, 383, 935, 935.1, 942, 948, 987, 910; 10/86 C; 403/358, 370, 374

[56] References Cited

U.S. PATENT DOCUMENTS

| Re. 27,616 | 4/1973 | Diaz | 411/910 |
|---|---|---|---|
| 3,298,272 | 1/1967 | Henderson . | |
| 3,322,976 | 12/1965 | Holman . | |
| 4,041,833 | 8/1977 | Wagner . | |
| 4,411,550 | 10/1983 | Schutt et al. | 403/358 |
| 4,645,397 | 2/1987 | Howe | 411/910 |
| 4,645,422 | 2/1987 | Brushaber | 411/910 |

FOREIGN PATENT DOCUMENTS

| 070247 | 1/1983 | European Pat. Off. . | |
|---|---|---|---|
| 1919340 | 10/1969 | Fed. Rep. of Germany . | |
| 2401347 | 3/1979 | France . | |
| 2531155 | 2/1984 | France . | |
| 2595125 | 9/1987 | France . | |
| 1138790 | 1/1969 | United Kingdom | 411/374 |
| 2082711 | 3/1982 | United Kingdom . | |

*Primary Examiner*—Neill R. Wilson
*Attorney, Agent, or Firm*—Sandler & Greenblum

[57] ABSTRACT

A device for preventing loosening of a prismatic member, such as a fixing nut, screw head or bolt, and particularly a lock nut of a wheel of an automobile vehicle, includes a cap adapted to cover the head of the prismatic member. The cap includes a transverse bottom and a cylindrical skirt in one piece with the bottom and a mechanism means for locking the prismatic member received in the cap. The locking mechanism for the prismatic member in the cap are constituted, in combination, by a ramp inclined with respect to the longitudinal axis of the cap, placed inside the skirt, a shim placed between the ramp and the lateral face of the prismatic member sliding both on the ramp and on the lateral face of the prismatic member, and an arrangement for longitudinally displacing the shim in contact with the ramp and the lateral face in order to exert a transverse effort for locking the prismatic member.

12 Claims, 1 Drawing Sheet

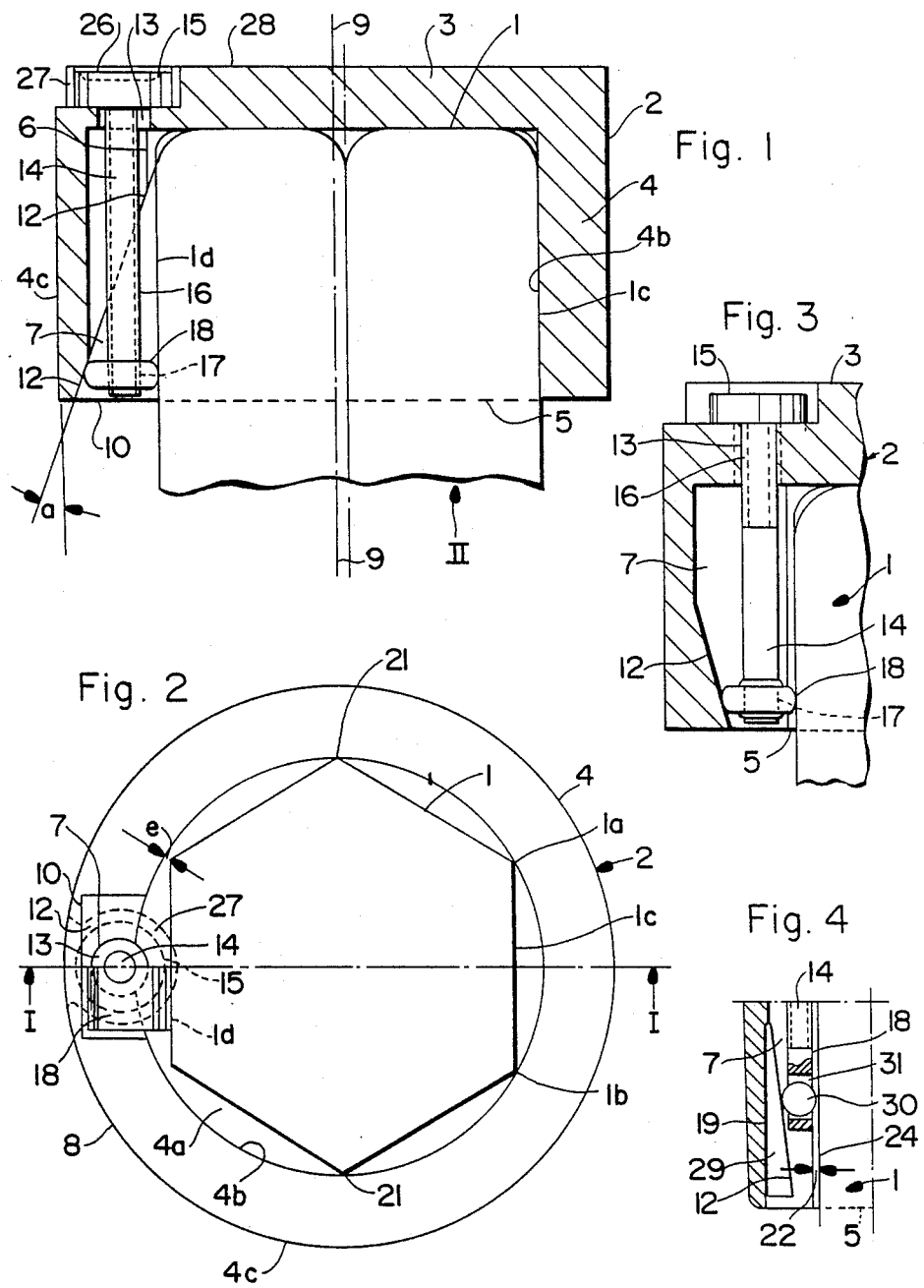

DEVICE FOR PREVENTING LOOSENING OF A MEMBER

BACKGROUND OF THE DESCRIPTION

The present invention relates to a device for preventing a fixing nut, screw or bolt from being loosened, adapted to be used in particular, but not exclusively, as an anti-theft device for a wheel of an automobile vehicle.

Anti-theft devices are already known which are intended to prevent dismantling by a third party of a wheel of an automobile vehicle. Certain of these of these devices employ a special lock nut which is itself capped by a cylindrical cap which may be rendered fast with the special nut by means actuated by a spanner. Other devices of this type use a locking mechanism comprising lugs displaced magnetically. All these devices present the drawback of requiring the use of a special nut in place of a standard lock nut.

Other anti-theft devices employ an intermediate sleeve which is locked in a non-removable manner on one of the fixing nuts and of which the front face presents a combination of hollows adapted to receive catches of an unlocking spanner. These catches are disposed on the spanner in the same manner as the hollows on the intermediate sleeve in order to be able to engage in these hollows and drive in rotation the intermediate sleeve and the lock nut which is fast therewith when the unlocking spanner is rotated.

Such a device presents the drawback of being relatively expensive and of using the intermediate sleeve as an effort transmitting member when tightening and loosening the lock nut.

A device of this type is also known at the present time in which, between the cap and the fixing nut, screw or bolt, there is interposed a longitudinally slit intermediate bush, of polygonal internal cross section, identical to the outer profile of the nut or head of the fixing screw or bolt, the cylindrical outer lateral surface of the intermediate bush presenting, over part of its height, a thread identical to that of the cap. In this way, if this intermediate bush is crushed on the nut or head of the fixing screw or bolt, any possibility of axial withdrawal of the cap is prevented.

The device of this type has proved fairly efficient, but it presents the major drawback of comprising said intermediate bush which is a member difficult to manufacture and which risks being lost or soiled, which renders the device unusable.

SUMMARY OF THE INVENTION

It is an object of the present invention to overcome these drawbacks by providing a device of particularly simple design and of low cost price.

According to the invention this device for preventing loosening of a prismatic member, such as a fixing nut, screw head or bolt, and particularly a lock nut of a wheel of an automobile vehicle, includes a cap adapted to cover the head of the prismatic member. The cap includes a transverse bottom and a cylindrical skirt in one piece with the bottom and further includes means for locking the prismatic member inserted into the cap, by two opposites edges of one of its lateral faces in abutment against the inner face of the skirt, by tightening with the aid of tightening means cooperating with gripping means borne by a spanner, of characteristic shape and arrangement, in order to prevent any possibility of axial withdrawal of the cap. The means for locking the prismatic member in the cap are constituted in combination by a ramp inclined with respect to the longitudinal axis of the cap, placed inside the skirt, a shim placed between the ramp and the lateral face of the prismatic sliding both on this ramp and on the lateral face of the prismatic member, and means for longitudinally displacing the shim in contact with the ramp and the lateral face in order to exert a transverse effort for locking the prismatic member.

The device of the present invention offers the major advantage, for an industrial product, of being highly simple to manufacture, of extremely low cost price and of comprising only pieces which are very simple to manufacture, and especially very easy to replace, ensuring both a perfect locking of the prismatic member to be fixed and an optimally safe tightening and loosening, which guarantees security of use of the device at the highest level.

BRIEF DESCRIPTION OF THE DRAWINGS

The invention will be more readily understood on reading the following description with reference to the accompanying drawings, in which:

FIG. 1 is a view in axial section along line I—I of FIG. 2, of a first embodiment of the device according to the invention, intended for preventing loosening of a lock nut of a vehicle wheel, the device being shown mounted on the nut.

FIG. 2 is a front view in the direction of arrow II of FIG. 1, of the same embodiment of the device.

FIG. 3 is a partial view in section, similar to that of FIG. 2, of another embodiment of the invention.

FIG. 4 is a partial view in section showing another embodiment of the shim according to the present invention.

DESCRIPTION OF THE PREFERRED EMBODIMENTS

Referring now to the drawings, and firstly to FIGS. 1 and 2, the device according to the invention is intended to prevent loosening of a prismatic member whose cross section is in the form of a regular polygon, and in particular of a hexagon, and particularly of a nut 1 for locking a wheel of an automobile vehicle. However, the device according to the invention is also applicable to any fixing screws or bolts.

The device according to the invention is constituted in the first place by an outer cap 2 which comprises a transverse bottom 3 extended by a cylindrical peripheral skirt 4, defining at its end an orifice 5 giving access from the outside to the hollow 4a in the skirt 4.

This hollow 4a has a diameter slightly larger than the maximum transverse dimension of the nut 1, measured between two opposite edges, with the result that the screw head 1 may enter very easily into the hollow 4a until it touches the inner face of the bottom 3. Between each edge of the nut 1 and the inner face 6 of the skirt 4, there consequently remains a small clearance e.

In operation, the nut 1 is housed in the hollow 4a of the cap 2, with the result that it lies, in this situation, in abutment by two of its edges 1a, 1b which define one of its lateral faces 1c, on the inner surface 6 of the skirt 4, as shown in FIG. 2 of the drawings.

The device of the invention also comprises means for locking the nut 1, introduced in the hollow 4a of the skirt 4, against the inner face 6 thereof by tightening with the aid of tightening means, cooperating with gripping means borne by a spanner (not shown in the drawings). These tightening means, as well as the gripping means borne by the spanner, have a characteristic shape in order to prevent an ordinary tool from being used for unlocking the nut 1 and withdrawing it from the cap 2. These means may be of the type generally known up to the present time, such as a certain number of randomly distributed recesses, adapted to cooperate with similar projecting parts of a spanner, for screwing or unscrewing the bolt alone. These means may also be constituted by a single recesses but of characteristic shape cooperating with a projection of identical shape borne by the maneuvering spanner, the combination of the recess and of the projection varying from one spanner to another, in order not to allow use of the spanner for unscrewing bolts other than those with which it is associated.

The device of this invention comprises, as means for locking the nut 1 in the hollow 4a of the skirt 4, in combination, a ramp 12 inclined with respect to the longitudinal axis 9 of the cap 2, placed inside the skirt 4, a shim 18 placed between the ramp 12 and the opposite lateral face 1d of the nut 1, sliding both on this ramp 12 and on the lateral face 1d of the nut, and means for longitudinally displacing, in the direction parallel to the longitudinal axis 9, the shim 18 in contact with the ramp 12 and the lateral face 1d. By this longitudinal displacement of the shim, a force is exerted on the nut 1 to lock it in the hollow 4a of the skirt 4 or to unlock it.

According to the present invention, the cylindrical skirt 4 of the cap 2 presents, in its inner face 4b, a radial notch 7 not reaching the outer face 4c of the skirt 4. This notch 7 has a generally rectangular cross section, in a plane perpendicular to the axis 9 of the cap 2, as shown in FIG. 2 of the drawings.

The notch 7 is elongated parallel to the longitudinal axis 9 of the cap 2 and it opens out at its lower end in the transverse plane of the orifice 5 of the cap, forming a rectangular opening 10, of greater depth than that of the upper part of the notch 7. The notch 7 is truncated along a plane, constituting the ramp 12, inclined with respect to the axis 9 of the cap by an angle a, for example, but in non-limiting manner, preferably 20°, as indicated in FIG. 1, the plane of the ramp 12 converging towards axis 9 above the cap 2, outside the skirt 4. Consequently, the notch 7 has a depth which is constant in its lower part, then increasing from the bottom 3 side of the cap 2 towards the side opening out in the orifice 5.

The transverse bottom 3 of the cap 2 presents, at the level of notch 7, a circular bore 13 intended for the passage of the shank 14 of a longitudinal bolt, of which the cylindrical head 15, of larger diameter than the diameter of the bore 13, comes into abutment, when the shank 14 of the bolt is introduced through the bore 13 inside the notch 7 of the skirt 4, on the edge of this bore, outside the cap, against the outer face of the bottom 3.

The shank 14 of the bolt bears, on the side opposite its head 15, a thread 16 screwing in a tapped hole 17 borne by a shim 18 in the general form of a rectangular prism elongated transversely with respect to the notch 7. The shim 18 normally comes into abutment, when the shank 15 is introduced through the bore 13 inside the skirt 4, by one of its faces, on the inclined ramp 12, on which slides the shim 18 when the rod 14 of the bolt is screwed in the tapped hole 17 of the shim 18. In order to facilitate this slide, the face in contact with the shim 18 is preferably rounded, being convex towards the ramp 12, as shown in FIG. 1.

When the nut 1 is introduced into the hollow 4a of the cap 2, it presents, opposite the notch 7, one of its lateral faces 1d so that the shim 18 comes into abutment on this lateral face 1d by its front face, which is opposite its face which is in abutment on the ramp 12 of the notch 7, as already described. In this situation, the nut 1 is in abutment, by its two edges 1a,1b which define its face 1c diametrically opposite the lateral face 1d placed opposite the notch 7, on the inner face 4b of the skirt 4. The whole of the clearance e is, in this situation, transferred on the notch 7 side, as shown in FIG. 2 of the drawings.

The front face of the shim 18 in contact with the nut 1 is preferably rounded with its convexity directed towards the lateral face 1d of the nut 1, so that contact between these faces is reduced to a minimum.

The bolt 14, 15 is preferably provided with a cylindrical head, comprising the tightening means cooperating with the gripping means borne by the spanner for maneuvring the bolt mentioned. In this embodiment of the invention, the means for locking the nut 1 in the hollow 4a are constituted by the ramp 12, the shim 18 borne by the bolt provided with the shank 14 and the head 15 and, as means for longitudinally displacing the shim 18, this same bolt 14,15.

In order better to ensure the possibility of using any tool whatsoever, such as a screwdriver or pliers, for manipulating the cap 2 of the device of the invention, according to a preferred but non-limiting embodiment, a circular safety hollow 27 is made, around the bore 13, in the outer face 28 of the bottom 3 of the cap 2, with a diameter greater than that of the head 15 of the bolt and coaxial with the bore 13. The head 15 of the bolt is housed in this hollow 27, being driven in the bottom 3, at such a level that the outer face 26 of this head 15 is inside the hollow 27. The means for manipulating the bolt 14 are placed in any appropriate manner so that their access is possible only with the spanner expressly provided.

In order to position the device according to the invention on the nut 1 to be locked, the nut 1 is totally engaged in the hollow 4a of the cap 2 so that the front face of the nut 1 comes into contact with the bottom 3. The special spanner which may be the only one used to that end, then screws the shank 14 of the bolt in the shim 18, which is then displaced in the direction of the bottom 3, sliding in contact on the inclined ramp 12 of the notch 7 and at the same time on the lateral face 1d of the nut 1. Due to the inclination of the ramp 12, the shim 18 progressively pushes the nut 1 towards the inner face 4b of the skirt 4 on the side of the face 1c in abutment by its two edges 1a,1b. As the shank 14 of the bolt is tightened, the nut 1 is jammed more and more between the inner face 4b of the skirt 4 and the shim 18, with the result that it becomes possible to withdraw the cap 2 and to clear access to the nut 1, without previously loosening the bolt 14,15 to slide the shim 18 towards the inlet opening 10, which is possible only by employing the spanner expressly intended for this operation.

According to another embodiment of the invention, shown in FIG. 3, the notch 7 has a depth which is constant in its upper part then decrease towards the side opening into the orifice 5. The inclined lower end part 12 of the bottom of the notch 7 likewise constitutes, due to its inclination with respect to the longitudinal axis of the cap 2, the ramp for the sliding of the shim 18. The shank 14 of the bolt bears, on the head 15 side, a thread 16 screwing in a tapping made in the bore 13 of the bottom 3 of the cap 2. The hole 17 made in the shim 18 is then smooth and it is provided with known means for enabling the shank 14 to rotate about the longitudinal axis of the bolt, without being able to move axially in this hole 17.

In this embodiment of the invention, due to the inclination of the ramp 12 in opposite direction with respect to the preceding embodiment, as the shank 14 is advanced, the nut 1 is jammed above and more in the hollow 4a of the cap 2.

According to another embodiment of this same invention shown in FIG. 4 of the drawings, the depth of the notch 7 is constant over the whole of its length. In this notch 7 is introduced by force a piece 29 in the form of a wedge so that it comes into abutment by a plane face against the bottom 19 of the notch 7, and it presents, towards the inside of the hollow 4a of the skirt 4, an inclined face constituting the ramp 12 for slide of the shim 18, in the same way as for the preceding embodiments. The shim 18 is provided with means allowing the shank 14 to rotate about the longitudinal axis of the bolt, without being able to move axially with respect to this shank 14, and it comprises a slot 31 elongated in the axial direction of the shank 14, slot in which a cylindrical bar 30 is placed for rotation, along its longitudinal axis transverse with respect to slot 31, the diameter of said bar enabling it to project out of the slot 31. When the shim 18 is locked between the ramp 12 and the nut 1, it is then said bar 30 which is in abutment on the opposite faces of the ramp 12 and nut 1. According to a variant, the bar 30 may be replaced by a ball.

The embodiments of the device according to the invention illustrated in FIGS. 3 and 4 offer the advantage that the outer cap 2 cannot be torn off, since, the more the cap 2 is pulled, the more it tends to be jammed.

We claim:

1. In a device for preventing loosening of a prismatic member, comprising a cap adapted to cover the head of the prismatic member, said cap comprising a tranverse bottom and a cylindrical skirt in one piece with the bottom and means for locking the prismatic member received within said cap, by two opposite edges of one of its lateral faces in abutment against the inner face of the skirt, by tightening with the aid of tightening means cooperating with gripping means in the form of a spanner, of a predetermined shape and arrangement, in order to prevent any possibility of axial withdrawal of the cap, the means for locking the prismatic member in the cap are constituted in combination by a ramp inclined with respect to the longitudinal axis of the cap, placed inside the skirt, a shim placed between the ramp and the lateral face of the prismatic member sliding both the ramp and on the lateral face of the prismatic member, and means for longitudinally displacing the shim in contact with the ramp and the lateral face in order to exert a transverse force for locking the prismatic member, wherein the cylindrical skirt comprises, in its inner face, a radial notch whose cross-section is generally rectangular in form, elongated in parallel to the longitudinal axis, opening out in the transverse plane of the orifice of the cap, the notch being truncated along an inclined plane with respect to the axis of the cap and constituting the ramp which converges towards the axis, moving closer thereto on the cap bottom side and moving away therefrom on the orifice side.

2. The device of claim 1, wherein the bottom of the cap presents, at the level of the notch, a bore through which passes a shank of a bolt constituting the means for longitudinally displacing the shim, the shank bearing, on the side opposite the head of the bolt, a thread received in a tapped hole formed in the shim, the head of the cylindrical bolt coming into abutment on the edge of the bore, outside the cap, and being provided with means for tightening and turning the bolt.

3. The device of claim 2, wherein a safety hollow is made in the outer face of the bottom of the cap, coaxially with the bore, in which the head of the bolt is driven in the bottom at such a level that the outer face of the head is inside this hollow.

4. The device of claim 1, wherein the depth of the notch is constant over the whole of its length and a piece in the form of a wedge is introduced in the notch so that it presents, towards the inside of the cap, an inclined face constituting the ramp for the sliding of the shim.

5. In a device for preventing loosening of a prismatic member, comprising a cap adapted to cover the head of the prismatic member, said cap comprising a transverse bottom and a cylindrical skirt in one piece with the bottom and means for locking the prismatic member received within said cap, by two opposite edges of one of its lateral faces in abutment against the inner face of the skirt, by tightening with the aid of tightening means cooperating with gripping means in the form of a spanner, of a predetermined shape and arrangement, in order to prevent any possibility of axial withdrawal of the cap, the means for locking the prismatic member in the cap are constituted in combination by a ramp inclined with respect to the longitudinal axis of the cap, placed inside the skirt, a shim placed between the ramp and the lateral face of the prismatic member sliding both on the ramp and on the lateral face of the prismatic member, and means for longitudinally displacing the shim in contact with the ramp and the lateral face in order to exert a transverse force for locking the prismatic member, wherein the shim is generally in the form of a rectangular prism, elongated transversely with respect to the notch, and including a face in contact with the ramp which is rounded and convex towards the ramp.

6. The device of claim 5 wherein the inclined plane constituting the ramp converges towards the axis towards the side opening out in the orifice of the cap, the bottom of the cap presents, at the level of the notch, a bore through which passes a shank of a bolt constituting the means for longitudinally displacing the shim, the shank of the bolt bearing, on the head side, a threading received in a tapping located in the bore of the cap, the hole for the shim being smooth and provided with means allowing the shank to rotate about the longitudinal axis of the bolt without being able to moe axially in said hole.

7. The device of claim 6, wherein a safety hollow is made in the outer face of the bottom of the cap, coaxially with the bore, in which the head of the bolt is driven in the bottom at such a level that the outer face of the head is inside this hollow.

8. A device for preventing the loosening of a fastening member comprising:
 (a) a cap having a transversely extending bottom and a skirt depending from said transverse bottom defining a hollow region for receiving the fastening member, said skirt further comprising:
  (i) an inner face;
  (ii) a longitudinally extending notch for receiving a bolt; and (iii) a ramp which is inclined with respect to the longitudinal axis of the fastener; and (b) means for locking the fastening member within said hollow region of said cap comprising:

(i) a bolt extending within such notch of said skirt; and (ii) a shim threaded upon said bolt for engagement with said ramp and the fastening member, whereby upon rotation of said bolt in a first direction, said shim is moved longituindally to exert a transverse force to the fastening member against said inner face of said skirt of said cap to thereby lock said cap upon the fastening member.

9. The device of claim 8, wherein said shim has a rounded face for engagement with said ramp of said skirt.

10. The device of claim 8, wherein said bolt includes a head, wherein said transverse bottom of said cap comprises a recess communicating with said notch of said skirt, wherein said bolt has a threaded portion extending within said notch and said head of said bolt is received within said recess.

11. The device of claim 10, wherein said head of said bolt has a predetermined longitudinal length and said recess has a depth substantially equal to or greaterthan said predetermined longitudinal length of said head of said bolt.

12. In a device for preventing loosening of a prismatic member, comprising a cap adapted to cover the head of the prismatic member, said cap comprising a transverse bottom and a cylindrical skirt in one piece with the bottom and means for locking the prismatic member received within said cap, by two opposite edges of one of its lateral faces in abutment against the inner face of the skirt, by tightening with the aid of tightening means cooperating with gripping means in the form of a spanner, of a predetermined shape and arrangement, in order to prevent any possibility of axial withdrawal of the cap, the means for locking the prismatic member in the cap are constituted in combination by a ramp inclined with respect to the longitudinal axis of the cap, placed inside the skirt, a shim placed between the ramp and the lateral face of the prismatic member sliding both on the ramp and on the lateral face of the prismatic member, and means for longitudinally displacing the shim in contact with the ramp and the lateral face in order to exert a transverse force for locking the prismatic member, wherein the shim includes an axially elongated slot and in which is placed for rotation, along its longitudinal axis transverse with respect to the slot, a cylindrical bar whose diameter enables it to project from said slot to come into abutment on the opposite faces of the ramp and the prismatic member, when the shim is locked.

* * * * *